United States Patent
Vigneras et al.

(10) Patent No.: US 10,623,303 B2
(45) Date of Patent: Apr. 14, 2020

(54) METHOD OF ROUTING DATA AND SWITCH IN A NETWORK

(71) Applicant: BULL SAS, Les Clayes sous Bois (FR)

(72) Inventors: Pierre Vigneras, Angervilliers (FR); Jean-Noel Quintin, Bourg la Reine (FR)

(73) Assignee: BULL SAS, Les Clayes Sous Bois (FR)

( * ) Notice: Subject to any disclaimer, the term of this patent is extended or adjusted under 35 U.S.C. 154(b) by 139 days.

(21) Appl. No.: 15/318,885

(22) PCT Filed: May 21, 2015

(86) PCT No.: PCT/FR2015/051344
§ 371 (c)(1),
(2) Date: Dec. 14, 2016

(87) PCT Pub. No.: WO2015/193570
PCT Pub. Date: Dec. 23, 2015

(65) Prior Publication Data
US 2017/0126544 A1    May 4, 2017

(30) Foreign Application Priority Data
Jun. 16, 2014  (FR) ..................................... 14 55509

(51) Int. Cl.
*H04L 12/751*   (2013.01)
*H04L 12/935*   (2013.01)
(Continued)

(52) U.S. Cl.
CPC ............ *H04L 45/124* (2013.01); *H04L 45/02* (2013.01); *H04L 45/54* (2013.01); *H04L 49/30* (2013.01)

(58) Field of Classification Search
None
See application file for complete search history.

(56) References Cited

U.S. PATENT DOCUMENTS 8,611,349 B1 * 12/2013 Judge ................... H04L 41/12
                                                                 370/392
2009/0073994 A1 * 3/2009 Qureshi ............ H04L 29/12792
                                                                 370/401
(Continued)

OTHER PUBLICATIONS

Andrew S. Tanenbaum et al. "The Network Layer ED", Computer Networks, Fifth Edition, Jan. 1, 2011; pp. 373-382 and pp. 460-465 (17 pgs.).

(Continued)

*Primary Examiner* — Angel T Brockman
(74) *Attorney, Agent, or Firm* — Sughrue Mion, PLLC

(57) ABSTRACT

Method of routing data in a network, this data originating from a first node and being destined for a second node, this method comprising the following steps: —pre-recording in each of the switches of a list of switches directly interfaced with one or more nodes; —reception of the data by a first switch and determination of its destination; when the first switch is directly interfaced with the second node via an output port-selection then in routing of the data by said output port; otherwise —identification of the switch to which the second node is directly interfaced; —routing of the data to the identified switch via an output port of the first switch, so that the data can be forwarded to said identified switch.

9 Claims, 1 Drawing Sheet

(51) Int. Cl.
*H04L 12/721* (2013.01)
*H04L 12/741* (2013.01)

(56) References Cited

U.S. PATENT DOCUMENTS

| | | | |
|---|---|---|---|
| 2014/0064144 A1* | 3/2014 | Beshai | H04L 45/60 370/254 |
| 2014/0185611 A1* | 7/2014 | Lie | H04L 49/25 370/355 |
| 2017/0012869 A1* | 1/2017 | Loher | H04L 45/54 |

OTHER PUBLICATIONS

Perlman "Load Splitting ED", Interconnections: Bridges, Routers, Switches, and Interworking protocols; Second Edition; Jan. 1, 2000; pp. 325-326 and pp. 335-336 (6 pgs.).

International Search Report, issued by International Searching Authority in corresponding International Application No. PCT/FR2015/051344, dated Aug. 11, 2015.

* cited by examiner

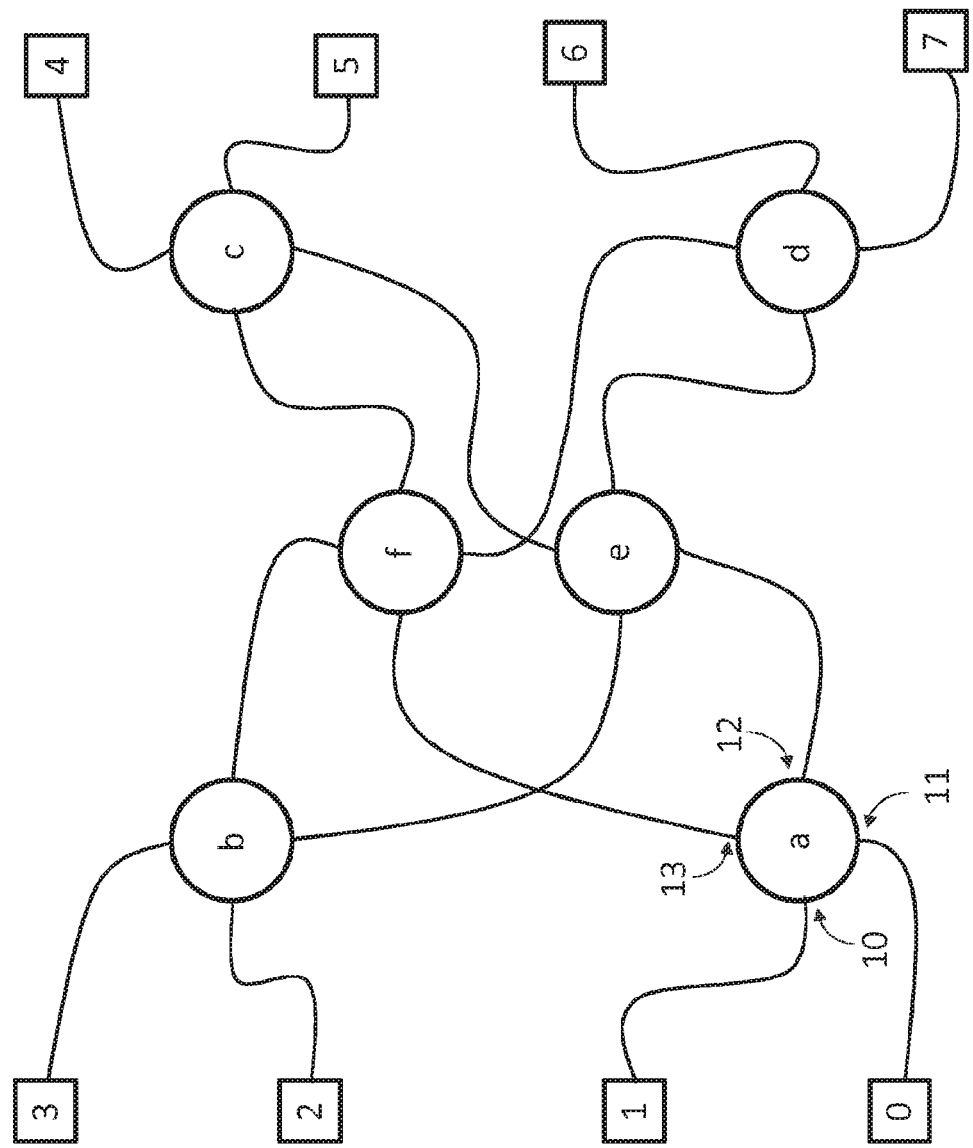

METHOD OF ROUTING DATA AND SWITCH IN A NETWORK

CROSS REFERENCE TO RELATED APPLICATIONS

This application is a National Stage of International Application No. PCT/FR2015/051344, filed on May 21, 2015, which claims priority from French Patent Application No. 14 55509, filed on Jun. 16, 2014, the contents of all of which are incorporated herein by reference in their entirety.

The invention concerns the domain of routing through a network. More particularly, the invention concerns the management of the tables enabling the routing of information flow through a network of a supercomputer.

Appearing first in the 1960s, the progressive evolution of supercomputers called HPC (high-performance computing) has made it possible to provide ever-greater computing power and data-processing capacities over the years. These supercomputers are currently used for modeling and simulating complex phenomena that cannot be achieved by the experimental approach. Supercomputers are therefore employed for a great variety of applications such as meteorological simulations, financial modeling, probability analyses, as well as aeronautical, medical, physical, molecular or nuclear simulations.

A supercomputer is typically formed by a network of nodes interconnected by switches. A node, for example, can be a computer, a server or any other computerized terminal comprising a plurality of microprocessors, as well as means of data transmission/reception. Advantageously, these nodes make it possible to receive or transmit data (e.g., messages, packets, datagram) by means of one or more network peripherals, such as a network card. The function of the switches is to route the data from or to the nodes to which they are connected. Advantageously, the nodes and switches comprise a computer network or a graph according to a predetermined topology.

At this time, within the context of supercomputers, there are few networks utilizing an adaptive routing. Currently, in order to achieve an adaptive routing, each switch keeps a routing table of information concerning the different possibilities for each packet to be able to reach any possible destination.

The creation of a routing table currently is a result of software responsible for calculating all possible paths of a packet to a destination. For example, Dijkstra's algorithm is currently implemented to calculate all of the shortest paths in a graph. Generally, with a view to avoiding recalculating the paths for each modification of a calculation algorithm, all of the possible paths for all of the nodes of the graph are pre-recorded in the memory space of the switches. This results in very voluminous routing tables for graphs of limited complexities. The topologies of graphs or networks for supercomputers are highly complex, due to the high number of interconnected nodes and switches. The number of possibilities of recipients and possibilities of paths being limited by the memory space available in each switch, such a solution proves to be limited because it does not enable all routing possibilities to be covered.

Other known proposals consist of utilizing hierarchical routing solutions. Within the context of these solutions, routing is done not to a single destination, but to a subset formed of a plurality of destinations. It is therefore possible to choose a group comprising a restricted number of destinations. However, such proposals are also limited. Indeed, it is impossible to determine all possibilities of paths to a destination, due to the limitation in a switch of the memory space needed for storing calculations, as well as the calculation time needed to determine such information.

A first objective is to remedy the aforementioned disadvantages.

A second objective is to propose routing tables making it possible to cover all possible routes to a given destination.

A third objective is to propose an adaptive routing solution enabling the constraints of calculation times and calculation memory space limitations in a switch to be overcome.

A fourth objective is to limit the volume of memory used by the routing tables in the switches of a network or of a graph.

To that end, according to a first aspect, a method is proposed of routing data in a network comprising a plurality of switches and a plurality of nodes, said data coming from a first node and being destined for a second node, said method comprising the following steps:
  pre-recording in each of the switches of the network a list of switches directly interfaced with one or more nodes;
  reception of the data by a first switch via an input port;
  determination of the destination of said data by the first switch; when the first switch is directly interfaced with the second node via a specific output port
  selection then routing of the data by said specific output port; otherwise
  identification of the switch to which the second node is directly interfaced, by comparison between the destination of the data and the list of pre-recorded switches;
  routing of the data to the identified switch via an output port of the first switch, in such a way that the data can be routed to said identified switch.

Advantageously, in said method, the selection of the output port to the identified switch is achieved by a step of comparison between the identified switch and a routing table of the first switch, each entry of said table comprising
  information enabling a switch interfaced with at least one node to be identified;
  a set of aggregated information describing at least one route by a specific port to said switch interfaced with at least one node.

Advantageously, in this method, for a plurality of possible routes to a switch interfaced with at least one node, the selection of the output port is made as a function of the aggregated information, said information comprising the number of hops, the congestion or weighting of the links or nodes on the route enabling the switch to be reached via a specific port.

Advantageously, in this method, the network is a supercomputer topology.

According to a second aspect, a computer program product is proposed, executed on a memory medium, capable of being implemented within a computerized processing unit and comprising instructions for the implementation of the method summarized above.

According to a third aspect, a switch is proposed in a network comprising a plurality of switches and a plurality of nodes, said switch comprising
  a plurality of input and output ports capable of receiving and routing data coming from a first node and destined for a second node;
  a pre-recorded list of switches directly interfaced with one or more nodes;
  means capable of determining the destination of said data;

means capable of selecting then routing the data by a specific output port, when the switch is directly interfaced with the second node via said specific output port;

means capable of identifying a second switch to which the second node is directly interfaced, by comparison between the destination of the data and the pre-recorded list of switches;

means capable of selecting then routing the data to the second identified switch via an output port, such a way that the data can be routed to said second identified switch.

Advantageously, in said switch, the selection of the output port to the identified switch is achieved by means capable of comparing the second identified switch with the entries from a pre-recorded routing table, each entry of said table comprising information enabling the identification of a switch interfaced with at least one node;

a set of aggregated information describing at least one route by a specific port to said switch interfaced with at least one node.

Advantageously, said switch comprises means capable of selecting, for a plurality of possible routes to a switch interfaced with at least one node, one output port based on the aggregated information, said information comprising the number of hops for a specific port, the congestion or the weighting of the links or nodes on the route enabling the switch interfaced with at least one node to be reached.

According to a fourth aspect, a network of a supercomputer is proposed, comprising a plurality of switches and a plurality of nodes, the switches being produced in the manner summarized above.

Other objects and advantages of the invention will be seen from the description of an embodiment, provided with reference to the appended drawings in which FIG. 1 is an example of simplified topology of a network or a graph, comprising a plurality of nodes and a plurality of switches.

According to various embodiments, a network or a graph is considered, comprising a plurality of nodes and switches disposed according to a predetermined topology. Advantageously, said network or graph relates to the topology of a supercomputer, or to any other network or graph having a similar topology.

A node, for example, can be a computer terminal comprising means of transmitting and receiving data, such as one or more network cards, as well as data processing means, for example a plurality of microprocessors. Advantageously, the nodes enable:

the execution of instructions received via an interface, for example carrying out a succession of calculations. These are called calculation nodes;

managing the inputs/outputs of data storage systems. These are called service, administration or storage nodes.

With regard to the switches, they comprise a plurality of input and output ports, and can be interfaced directly with other switches. "Directly interfaced" is understood here as the fact that two entities, switches in this instance, each comprise at least one interface (e.g., input/output port), are connected by a link disposed between each of said interfaces, for example, a physical or virtual link;

interconnect different nodes of the network or of the graph, and ensure the routing/switching of data from or to different nodes. Hereinafter, said switches are designated by the term leaf switches.

FIG. 1 illustrates a very simplified example of a network or graph topology, comprising a plurality of nodes 0, 1, 2, 3, 4, 5, 6, 7 and a plurality of switches a, b, c, d, e, f. In this example:

nodes 0 and 1 are interfaced with the switch a;
nodes 2 and 3 are interfaced with the switch b;
nodes 4 and 5 are interfaced with the switch c;
nodes 6 and 7 are interfaced with the switch d;
the switch e is interfaced with switches a, b, c, d;
the switch f is interfaced with switches a, b, c, d;
only switches a, b, c, d are leaf switches.

In the following, a network or a graph is considered, modeling for example the topology of a supercomputer, comprising a first node connected to a first switch and a second node connected to a second switch.

Typically, when a first switch receives a datagram (or any other data) by an input port from a first node and destined for a second node, the first switch checks its routing table. If the second node is directly interfaced via an output port with the first switch, for example via a wired link, the first switch sends the packet to it. Otherwise, said second node is interfaced with another switch, i.e., a second switch. The first switch then seeks to identify a route to the second destination node. The routing table of the switch then makes it possible to perform an adaptive routing via the selection of a suitable output port. Adaptive routing is understood here as being the choice of one path among a plurality thereof, in order to reach the destination, taking into account the status of the network, for example the congestion thereof.

To do this, the routing table of the switch is currently formed by a plurality of entries, each entry being able to contain one or more routes to a destination node. An entry therefore comprises information related to one or more output ports that can be selected.

The choice of the output port, and therefore of the routing, is currently determined based on a variety of characteristics, such as: congestion of the nodes or links (e.g., cables) in the network, number of hops required to reach the destination node (hop count), weightings attributed to the different intermediate nodes or switches. Advantageously, all of these characteristics are stored in the pre-recorded routing table for each of the switches.

By way of example, let us consider the switch a in FIG. 1. In this example, said switch comprises four ports 10, 11, 12, 13 that can be used as input or output ports, depending on the direction of circulation of the data in the network. In the current state-of-the-art, a very simplified representation of the routing table of said switch is presented in the following form:

| Destination node | Number of associated output port(s) |
|---|---|
| 0 | 11 |
| 1 | 10 |
| 2 | 12; 13 |
| 3 | 12; 13 |
| 4 | 12; 13 |
| 5 | 12; 13 |
| 6 | 12; 13 |
| 7 | 12; 13 |

Moreover, each port number in this example is associated with information (not shown) related to the route to reach the destination, for example the number of hops required, or any other previously mentioned characteristic. Thus, when a switch receives a datagram for a given destination, it uses its routing table to perform a match between the destination and a port number, said port number being able to be chosen based on characteristics of the route up to the destination node.

However, the structure of this type of table has numerous disadvantages, particularly in terms of memory space used in each switch and possibilities of routes. For example, considering that said routing table has eight entries and a maximum of two recordable ports per entry, it can be seen that with such a table structure, the switch e in FIG. 1 is incapable of covering all possible combinations of routes to a destination. Indeed, even if the switch d proposes a shorter path in terms of topology to a destination, routes going through switches a, b, c are also valid.

Consequently, in order to cover all possibilities of routing to a destination node, according to various embodiments, each entry of the routing table of a switch is produced in such a way as to be able to reach a leaf switch connected to a group of destinations, i.e., a plurality of nodes. To do this, for each entry of the routing table, all of the information making it possible to reach a same switch connected to a group of destinations is aggregated. For example, for a same entry, the numbers (or any other identification information) of ports identified as being available/usable for the routing to a leaf switch directly interfaced with an identified destination is aggregated, as well as the characteristics of the paths to reach said leaf switch. A very simplified representation of such a routing table, for the switch a in FIG. 1, is provided below:

| Identification of the destination leaf switch | Number of associated output port(s) |
| --- | --- |
| a | empty field |
| b | 12; 13 |
| c | 12; 13 |
| d | 12; 13 |

Advantageously, the identification of a leaf switch to which a datagram is routed is established by each switch. For example, each switch determines information related to the destination of the datagram received, such as the destination address of the datagram (and potentially the address of the leaf switch as well), and based on this information, identifies the destination leaf switch. This translation can be accomplished through a table or a calculation on the destination address. For example, the switch identifies the address of the leaf switch to which the datagram is to be routed, via a comparison step between the destination of the datagram and a list of known leaf switches, which are for example pre-recorded or pre-identified in a data table. According to another example, assuming that each leaf switch is numbered and interfaced directly with n nodes, a division by n of the identifier (e.g., address) of a destination node enables the leaf switch number to be identified. For example, for two leaf switches "0" and "1," each interfaced with eight nodes, having the respective identifiers "0-7" and "8-15,"
the identification of the switch number is determined by dividing the identifier of a node by eight, then taking the whole part of that result.

Furthermore, each entry of the table comprises for each port number aggregated characteristics related to the path, enabling the leaf switch to be reached via said port number. For example: the number of hops to a destination leaf switch, the availability of physical links on the route or the congestion of intermediate nodes. Advantageously, these characteristics allow the switch to perform an adaptive routing via the selection of an output port proposing a route with optimal network characteristics. Said characteristics can, by way of example, be chosen during the network deployment, determined during a first exploration phase by means of an algorithm, or periodically evaluated in the network, for example via measurements or dynamic routing algorithms furnishing returns of information concerning the characteristics of the network.

Thus, each entry in the routing table no longer describes one or more routes to a destination node, but one or more routes to a destination leaf switch, said switch serving a plurality of destinations.

Advantageously, only the leaf switch of one destination group knows the characteristics (e.g., output port number to use) enabling the final routing of a datagram to a specific node to which it is directly interfaced. According to one embodiment, the characteristics concerning said final routing are for example initially known and pre-recorded in a table specific to each switch. A simple match between the table and the destination of the datagram allows the switch to determine the output port to which the datagram is transferred. A simplified representation of such a table specific to the switch a in FIG. 1 is provided below:

| Destination node | Number of associated output port(s) |
| --- | --- |
| 0 | 11 |
| 1 | 10 |

According to another embodiment, each switch is configured so as to be capable of establishing a match between an output port and a node to which it is connected without necessarily having such a table. For example, the switch is capable of querying, via a request, a node about its identity, such as about its identification number, via the physical link directly interconnecting an output port and said node, and then establishing a match between the port number and the identified node.

Thus, when a first switch receives on an input port a datagram to be routed to a destination node, it carries out the following operations:

it identifies by matching, for example via a step of comparison between one of its tables and the field specifying the destination of the datagram, a destination node to which it is connected, otherwise a second switch to which the destination node is connected;

if the switch is directly interfaced via an output port to the destination node, it routes the datagram by said port to the destination node;

otherwise, the switch identifies a second leaf switch connected to the destination node. It then establishes a match between an entry from its routing table relating to the second leaf switch and at least one output port related to said entry;

if the entry concerned comprises a plurality of output ports, the switch then determines the best output port based on characteristics of each port, for example by selecting the port that offers the minimum number of hops to the second leaf switch;

finally, the switch transmits the datagram to the best identified output port.

Moreover, as can be observed in the example of the preceding routing table, several entries related to different target switches can be related to the same output port numbers. The switch therefore preserves the aggregated information for each of its ports, and when it receives a datagram to be retransmitted, it is capable of resending said datagram to each of its ports. Advantageously, compared to the prior art, because of this characteristic, a destination is no longer limited to a fixed number of ports: the maximum number of possible routes is here limited only by the maximum number of output ports of each switch.

Furthermore, if one wishes to reduce even more the memory space used by the routing tables, it is also possible for a network or graph comprising a high number of leaf switches to aggregate a set of information relating to routes to a group of leaf switches.

A first example related to the previously described embodiments is provided below.

Considered here is the physical implementation of a switch in a network with an adaptive routing: the switch chooses for a given destination an output port from among the entries of its routing table. Said switch here comprises 48 input/output ports, and three adaptive routes for each destination.

In the prior art, each route is defined by six bits comprising the encoding of the output port number. Consequently, each destination requires 3*6=18 bits in the routing table of the switch. Let us now choose, for the embodiments previously described, a 48-bit table for each entry, i.e., for each leaf switch connecting a group of destinations.

When a group contains more than three destinations, the amount of memory used in the routing table is reduced. Indeed, the gain of memory for each entry here is 3*6*3/48, or 9/8 per entry. Moreover, the number of routing possibilities that was 3*3 adaptive routes in the prior art increases to a maximum number limited by the number of ports of the switch, 48 in this instance.

A fat-trees topology currently employed in supercomputer networks is related to the generalized PGFT (parallel ports generalized fat-trees) topology. In these topologies, the number of calculation nodes
connected to a same switch is one-half of the number of links, or 24 calculation nodes in this example. Thus, an overall memory gain for the calculation nodes is obtained for the routing table, which in this instance is 24*6*3/24, or a memory gain by a factor of 18.

Moreover, the greater the number of nodes present on the computer, the greater the gain in memory will be. Advantageously, the routing possibilities are also improved: if one or more physical connection links or switches breaks down, it will be possible for the switch directly connected to the breakdown to continue to route messages without outside intervention or communication, as long as one usable link remains for reaching the destination in its table.

A second example considers the software implementation of switches producing a routing of data or a calculation of the shortest paths in a graph simulating a network comprising a supercomputer.

Typically, in shortest-path calculation algorithms, such as Dijkstra's algorithm, each of the switches of a graph is considered as a peak of the graph, and stores in its "routing table (generally called shortest-paths table in the context of an algorithm for calculating shortest paths)" for each destination the neighbor offering the shortest path. Thus, from each switch of the graph, the shortest path is known by passing from neighbor to neighbor, and among all of the neighbors, several can lead to the destination with the same number of hops.

In accordance with the embodiments previously described, a shortest-paths calculation algorithm is implemented in each switch. Advantageously, in said algorithm, instead of storing a link to the shortest paths in memory in the routing table of each switch, the best-path characteristics for each output port are stored in memory going through said port to a leaf switch connecting a group of destination nodes. For example, the number of hops between the current switch and the leaf switch is stored in memory as a characteristic.

Advantageously, because a leaf switch potentially connects a high number of destination nodes, such an algorithm does not require additional memory for the routing table. Moreover, just as in the first example, if a communication link is cut, the switch remains capable of selecting one of the other links providing a path that is just as short.

Advantageously, such implementation of algorithm in a switch comprises a very limited memory complexity. Indeed, by denoting g as the number of leaf switches connecting groups of destination nodes, a as the maximum number of edges connected to a same node and n as the total number of nodes in the graph, then a memory complexity of $O(g*n*a)$ is obtained.

The relational reinforcement learning (RRL) algorithm of Ramalingam & Reps, which is a variant of Dijkstra's algorithm, typically has a memory complexity of $O(n^2*a)$. In considering the embodiments previously described, this memory complexity is reduced to $O(c*n*a)$, with c being the number of calculation nodes. Thus, if it is considered by way of example that each leaf switch comprises 24 calculation nodes, we obtain a memory gain of 24. Furthermore, the calculation time complexity for each entry is divided by the number of destinations within a same group, i.e., the number of nodes connected to a same leaf switch.

In this example, the previously proposed embodiments are compared with the RRL algorithm of Ramalingam & Reps, a graph being modeled with the following parameters:

| | |
|---|---:|
| Total number of switches | 9,792 |
| Number of calculation nodes | 55,296 |
| Number of leaf switches | 2,304 |
| Number of edges in the graph | 200,448 |
| Number of edges between switches | 145,152 |

The results obtained for this graph modeling, comprising the construction of tables of matches for each
of the switches, makes it possible to obtain a memory usage of about 10 GB with the proposed embodiments, compared to about 1 TB for the RRL algorithm of Ramalingam & Reps. By observation of the values of the previous parameters proposed, it will be understood that these results arise from the fact that it is more advantageous to work on leaf switches than on calculation nodes, because the latter are much more numerous in the graph.

Advantageously, a routing table comprising entries related to routes between a switch and leaf switches, compared to switch-type routing to nodes or node-to-node routing, includes numerous advantages:
  a simplification of the topology from the point of view of each switch, since each destination is no longer considered individually, but in groups of destinations;
  congestion of nodes is no longer a problem. Indeed, generally a routing procedure proves ineffective in resolving problems of congestions of nodes. When a node is unable to process all of the data coming from it, the balancing of the routes resolves nothing: at best, a routing makes it possible to reduce the number of adaptive routes destined for the congesting node;

the nodes are typically exponentially more numerous than the switches and therefore statistically more subject to breakdowns. In considering the proposed embodiments, the disappearance or reappearance of nodes in a network or a graph does not mean changes of perception of topologies from the point of view of the switches;

the number of switches typically being the log of the number of nodes, and the number of leaf switches the log of the number of switches, the memory complexity as well as the calculation complexity are considerably reduced.

The invention claimed is:

1. A method of routing data in a network comprising a plurality of switches (a-f) and a plurality of nodes (0-7), said plurality of nodes being distinct of said plurality of switches, said data coming from a first node and being destined for a second node, said method comprising:

pre-recording in each of the plurality of switches of the network a routing table, the routing table comprising a list of destination switches which, as a different entity from one or more destination nodes, are directly interfaced with the one or more destination nodes, wherein each entry in the routing table does not include one or more routes to a destination node but one or more routes to a destination switch directly interfaced with the destination node;

reception of the data by a first switch via an input port;

determination of a destination of said data by the first switch;

when the first switch is directly interfaced with the second node via a specific output port selection then routing of the data by said specific output port;

otherwise identification of a switch, as the destination switch, to which the second node is directly interfaced, by comparison between the destination of the data and the list of pre-recorded destination switches;

routing of the data to the identified switch via an output port of the first switch, in such a way that the data can be routed to said identified switch, the selection of the output port to the identified switch being performed by comparison between the identified switch and a routing table of the first switch, each entry of said routing table comprising:

information enabling a switch interfaced with at least one node to be identified;

a set of aggregated information describing at least one route by a specific port to said switch interfaced with the at least one node.

2. The method according to claim 1, wherein for a plurality of possible routes to said switch interfaced with the at least one node, the selection of the output port is made as a function of the aggregated information, said information comprising a number of hops, congestion or weighting of links or nodes on a route enabling the switch interfaced with the at least one node to be reached via the specific port.

3. The method according to claim 1, wherein the network is a supercomputer topology.

4. A computer program product executed on a memory medium, capable of being implemented within a computerized processing unit and comprising instructions for implementation of a method according to claim 1.

5. A switch in a network comprising a plurality of switches (a-f) and a plurality of nodes (0-7), said plurality of nodes being distinct of said plurality of switches, said switch comprising a plurality of input and output ports capable of receiving and routing data coming from a first node and destined for a second node;

a pre-recorded routing table, the routing table comprising a list of destination switches which, as a different entity from one or more destination nodes, are directly interfaced with the one or more destination nodes, wherein each entry in the routing table does not include one or more routes to a destination node but one or more routes to a destination switch directly interfaced with the destination node;

means capable of determining a destination of said data;

means capable of selecting then routing the data by a specific output port, when the switch is directly interfaced with the second node via said specific output port;

means capable of identifying a second switch, as the destination switch, to which the second node is directly interfaced, by comparison between the destination of the data and the pre-recorded list of destination switches;

means capable of selecting then routing the data to the identified second switch via an output port, in such a way that the data can be routed to said identified second switch, the selection of the output port to the identified switch being achieved by means capable of comparing the identified second switch with entries from the pre-recorded routing table, each entry of said routing table comprising:

information enabling the identification of a switch interfaced with at least one node;

a set of aggregated information describing at least one route by a specific port to said switch interfaced with the at least one node.

6. The switch according to claim 5, comprising means capable of selecting, for a plurality of possible routes to said switch interfaced with the at least one node, one output port based on the aggregated information, said information comprising a number of hops for the specific port, congestion or weighting of links or nodes on a route enabling the switch interfaced with the at least one node to be reached.

7. A network of a supercomputer, comprising the plurality of switches (a-f) and the plurality of nodes (0-7), the plurality of switches being produced in accordance with claim 5.

8. The method according to claim 1, wherein each destination switch, included in the list of destination switches, is a leaf switch.

9. The method according to claim 1, wherein the plurality of switches are separate devices than the plurality of nodes.

* * * * *